United States Patent [19]

Childress, Jr. et al.

[11] 3,872,510

[45] Mar. 18, 1975

[54] MAGNETIC TAPE CLEANING AND TENSIONING APPARATUS

[75] Inventors: Lloyd Krudop Childress, Jr.; John Allen Church, both of Austin, Tex.

[73] Assignee: International Business Machines Corporation, Armonk, N.Y.

[22] Filed: May 29, 1973

[21] Appl. No.: 364,768

[52] U.S. Cl. .......... 360/137, 15/93, 15/100, 134/9, 226/195

[51] Int. Cl. ...... G11b 5/00, G11b 15/43, B08b 1/02

[58] Field of Search .......... 360/137, 71, 130, 90–96; 226/119, 195; 15/93, 100; 134/9

[56] References Cited

UNITED STATES PATENTS

| | | | |
|---|---|---|---|
| 2,408,438 | 10/1946 | Mills | 15/100 |
| 3,266,196 | 8/1966 | Barcaro | 360/137 |
| 3,370,982 | 2/1968 | Hayunga | 360/137 |
| 3,534,894 | 10/1970 | Bretti | 226/195 |

*Primary Examiner*—Bernard Konick
*Assistant Examiner*—Robert S. Tupper
*Attorney, Agent, or Firm*—Douglas H. Lefeve

[57] ABSTRACT

A magnetic tape cleaning and tensioning apparatus is disclosed which performs the dual functions of cleaning magnetic tape and tensioning the tape, thereby providing a portion of tape free of debris and in tension at the reading and writing location. The magnetic tape is formed in a loop and is contained in a tape cartridge. Rollers are provided in the cartridge for separating portions of the magnetic tape so that adjacent surfaces of the tape do not contact each other. A tape cleaning and tensioning pad holder, having attached thereto a tape cleaning and tensioning pad, is contoured for providing an area of engagement of the pad and magnetic tape as the tape passes over one of the rollers contained in the cartridge. The cleaning and tensioning pad cleans debris, such as dust and loose oxide particles, from the tape and adds drag to the tape as it passes over this roller. A pressure roller and capstan engage the tape downstream from this roller such that the magnetic tape is in substantial tension between this roller and the capstan and pressure roller. As the tape moves downstream from the capstan and pressure roller, it is substantially loose until it again engages the cleaning and tensioning pad.

2 Claims, 2 Drawing Figures

MAGNETIC TAPE CLEANING AND TENSIONING APPARATUS

BACKGROUND OF THE INVENTION

1. Field of the Invention

This invention relates to magnetic tape handling and more particularly to a magnetic tape cleaning and tensioning apparatus for a magnetic tape loop, providing the dual functions of cleaning the magnetic tape and simultaneously tensioning a portion of the loop.

2. Description of the Prior Art

The pbulication by G. B. Flippen, Jr. and J. W. Ward, Jr., entitled LOOSE TAPE — TIGHT TAPE CARTRIDGE, *IBM Technical Disclosure Bulletin*, Vol. 15, No. 9, pages 2711 – 2712, February, 1973, discloses a magnetic tape loop and cartridge therefor in which a portion of the magnetic tape loop is relatively loose while another portion of the tape loop is in tension. A plurality of rollers is included within the tape cartridge to separate the loose portions of the tape so as to prohibit the force of gravity's tendency of allowing the loose portions of the tape to contact each other, a factor which tends to accelerate wear of the tape. The feature of providing a loose portion of the magnetic tape loop has the advantage that the rollers separating the loose portions of the loop do not require critical tolerances nor critical alignment. The rollers in the loose portion, may, therefore be inexpensive, molded plastic parts.

For accuracy and repeatibility in reading and writing upon a plurality of different tracks on the magnetic tape loop, however, it is desirable that the magnetic tape at the magnetic head position be in tension. The above publication teaches that such tension is provided by the inclusion of a drag clutch on a roller in the cartridge at a position in the cartridge upstream from the location of the magnetic reading and writing head. Downstream from the magnetic head is a capstan and pressure roller which cooperate to pull the tape past the head. The tape is in tension as it passes the head because drag is introduced into the tape loop by the drag clutch mounted on the roller over which the tape passes before it reaches the head position.

In contrast to the relatively inexpensive molded plastic rollers that may be used to separate the loose portions of the magnetic tape loop, the drag clutch required at the beginning of the tight portion of the tape loop is a relatively expensive component. It would, therefore, be desirable to eliminate the relatively expensive drag clutch while retaining its function.

Further, it has been discovered that during extended usage of the magnetic tape loop, a substantial amount of debris is collected on the loop which causes errors in magnetically reading information from the loop and writing information onto the loop. Therefore, it would also be desirable to provide a means for cleaning this debris off of the magnetic tape loop.

SUMMARY OF THE INVENTION

The invention disclosed herein provides an apparatus for cleaning debris from a magnetic tape loop while simultaneously imparting drag to a portion of the tape loop, thereby eliminating the necessity for a drag clutch while retaining its function and, additionally, providing the function of tape cleaning.

In the preferred embodiment the magnetic tape loop is contained in a tape cartridge. Rollers are provided in the cartridge for separating portions of the magnetic tape so that adjacent surfaces of the tape do not contact each other. A tape cleaning and tensioning pad holder, having attached thereto, a tape cleaning and tensioning pad, is contoured for providing an area of engagement of the pad and magnetic tape as the tape passes over one of the rollers contained in the cartridge. The cleaning and tensioning pad cleans debris, such as dust and loose oxide particles, from the tape and adds drag to the tape as it passes over this roller. A pressure roller and capstan engage the tape downstream from this roller such that the magnetic tape is in substantial tension between this roller and the capstan and pressure roller. As the tape moves downstream from the capstan and pressure roller, it is substantially loose until it again engages the cleaning and tensioning pad.

The foregoing and other objects, features and advantages of the invention will be apparent from the following more particular description of a preferred embodiment of the invention, as illustrated in the accompanying drawings.

DETAILED DESCRIPTION OF THE PREFERRED EMBODIMENT

Figure 1:
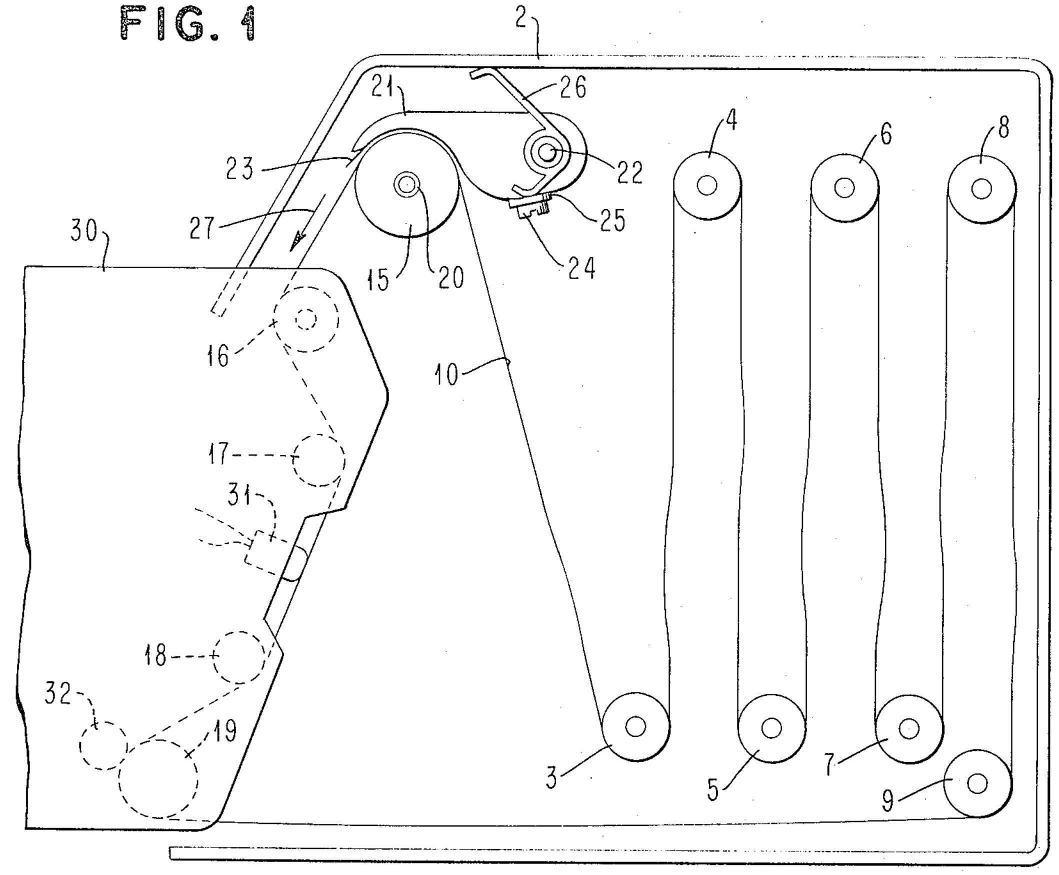
FIG. 1 is a side view of a magnetic tape system showing the magnetic tape cleaning and tensioning apparatus of this invention.

Referring now to FIG. 1, cartridge 2 is shown including therein magnetic tape loop 10 which passes over rollers 3 – 9 and roller 15 inside the cartridge. Tape loop 10 moves in the direction indicated by arrow 27 and is in substantial tension throughout a relatively short portion of the loop beginning at roller 15 and ending at capstan 32 and pressure roller 19. As tape loop 10 continues beyond pressure roller 19 in the direction indicated by arrow 27, tape loop 10 is substantially loose as it passes over rollers 9 – 3 and then up to roller 15. These rollers over which the tape loop passes in its loose portion require neither critical manufacturing tolerances nor critical alignment. For this reason, substantially inexpensive molded plastic rollers can be used for rollers 3 – 9.

In contrast to rollers 3 – 9, rollers 15 – 19 and capstan 32 require substantially precision manufacturing tolerances and substantially critical alignment. The problem of critical alignment is easily solved for rollers 16 – 19 and capstan 32, as these rollers and the capstan may be positioned with precision in fixed frame 30 to which is mounted, movable magnetic head 31. In cartridge 2, proper alignment of roller 15, the only roller in cartridge 2 requiring critical alignment, is provided by shaft 20 having substantially closer manufacturing tolerances than the molded plastic shafts for rollers 3 – 9.

In order to provide tension in the relatively short portion of magnetic tape between roller 15 and roller 19, some degree of drag must be introduced into the tape loop at roller 15. Further, in order to provide error free magnetic reading from and writing onto the tape loop, the tape surface to be read from or written upon must be periodically cleaned to remove the magnetic tape oxide particles and dust which collect on the surface of the tape loop.

Figure 2:
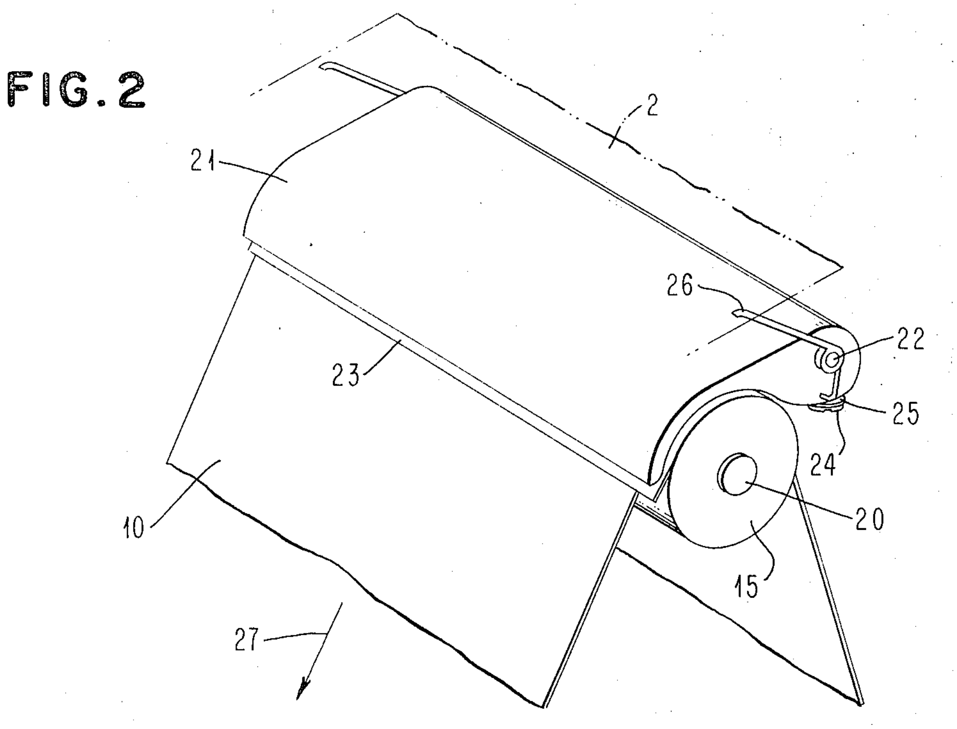
FIG. 2 is a perspective view of the magnetic tape cleaning and tensioning apparatus of this invention.

Referring now to FIGS. 1 and 2, the functions of providing drag to the magnetic tape at roller 15 and cleaning the magnetic tape are simultaneously performed by the spring biased engagement of cleaning pad 23 with tape loop 10 as the tape passes over roller 15.

Cleaning and tensioning pad holder 21 may be a relatively inexpensive molded plastic part. Cleaning and tensioning pad 23, which, as will be discussed in greater detail below, in the preferred embodiment includes a plurality of layers of a relatively porous and non-abrasive synthetic textile, is attached to pad holder 21 by screws 24 and washers 25. In the preferred embodiment pad holder 21 is contoured to provide contact of pad 23 and tape loop 10 over a predetermined area. This area contact is provided, not only by contouring holder 21, but also by forming pad 23 in a plurality of layers. Hole 22 in holder 21 is provided for engagement with a shaft or shafts (not shown) for pivotal movement of holder 21 toward tape 10. The shaft (not shown) for mounting holder 21 may pass through the sides (not shown) of cartridge 2.

Torsion springs 26 have one end engaging the inner surface of the top portion of cartridge 2 and their other ends engaging pad holder 21 at washers 25. Torsion springs 26 provide positive engagement through holder 21 of pad 23 and tape loop 10. It is recognized that the relative tension of springs 26 as well as the area of pad 23 in contact with tape 10 and the composition of pad 23 are parameters which may be varied to appropriately introduce the desired degree of drag and cleaning into the tape loop.

In attempting to clean and tension magnetic tape by means of a single cleaning and tensioning pad, it will be obvious to those skilled in the art that problems arise in choosing a material for the pad which is capable of performing the two functions of: (1) collecting relatively hard debris, such as dust and magnetic oxide particles, from the magnetic tape, while (2) maintaining a relatively constant coefficient of friction while engaging the tape by means of a non-adjustable biasing spring, thereby maintaining substantially constant tension in the area of tape reading and recording. Further, after a substantial amount of debris has been collected by the cleaning and tensioning pad, it would seem probable that the pad would exhibit an abrasive effect upon the magnetic tape which would tend to shorten the life of the tape loop.

It was deemed undesirable to use prior art cleaning cloths which are impregnated with a cleaning substance, since some of the substance may bleed out of the cloth, causing tape contamination and resultant reading and recording errors. We have discovered, however, that a cleaning and tensioning pad comprising about two layers of sheets of continuous-filament polyester fibers that are randomly arranged, relatively highly dispersed and bonded at the filament junctions, such as a spunbonded polyester, marketed by DuPont and identified by the trademark registered to DuPont, REEMAY, is very suitable for use as the cleaning and tensioning pad of this invention. Surprisingly, a slight amount of desirable abrasion is exhibited by this polyester material, which actually increases the useful life of the magnetic tape. This occurs because the magnetic oxide coating becomes more and more uniform as a result of this slight abrasion, thereby providing a better recording media as usage of the tape continues. Thus, the cleaning pad provides the dual functions of cleaning and tensioning the tape over a substantially long life at a substantially constant tension, such that the cleaning and tensioning pad requires replacement no sooner than the average life of the magnetic tape loop, cleaned by the apparatus of this invention. Moreover, because of the cleaning aspect of this invention, a magnetic tape loop cleaned and tensioned by this apparatus has a longer life than a comparable uncleaned, untensioned magnetic tape loop.

In summary, it will be observed that an inexpensive tape cleaning and tensioning apparatus has been disclosed which provides the obviously desirable feature of cleaning the head contacting portion of the magnetic tape loop just prior to the time that reading from or writing onto the tape is performed. Further, it will be observed that the disclosed apparatus introduces drag to the portion of the tape loop about to be read or written upon so that the tape may be properly guided for reading and writing. With the disclosed apparatus, the necessity for the inclusion of a relatively expensive, precision drag clutch is eliminated, although its function is retained.

While the invention has been particularly shown and described with reference to a perferred embodiment thereof, it will be understood by those skilled in the art that the foregoing and other changes in form and details may be made therein without departing from the spirit and scope of the invention. For example, it will be understood that the principles of this invention may be utilized in cleaning and tensioning a tape loop that is not contained in a cartridge. Further, the invention may also be utilized in a reel-to-reel or cassette tape system.

What is claimed is:

1. A magnetic tape handling apparatus comprising:

a magnetic tape loop;

a tape loop driver providing movement of said tape loop;

a roller positioned upstream from said driver over which a first surface of said tape loop passes, said roller freely rotating with movement of said tape loop over said roller; and a magnetic tape cleaning and tensioning pad including a number of layers of relatively porous polyester fibers, said fibers being substantially randomly arranged, relatively highly dispersed and substantially continuous filaments bonded at a number of junctions of said filaments, said pad positioned adjacent to and biased toward said roller, said pad engaging a second surface of said tape loop, whereby a first portion of said tape loop is pressed between said pad and said roller, said pad cleaning said second surface of said tape loop and said pad providing tension in a second portion of said tape loop between said roller and said driver substantially solely by friction between said second surface and said pad.

2. The magnetic tape handling apparatus of claim 1, further comprising a cleaning and tensioning pad holder conforming to the contour of said first portion of said tape loop passing over said roller, said cleaning and tensioning pad being interposed between said second surface and said holder.

* * * * *